United States Patent [19]
Noyes

[11] 3,947,084
[45] Mar. 30, 1976

[54] LONG-WAVE INFRARED AFOCAL ZOOM TELESCOPE

[75] Inventor: Gary R. Noyes, Los Angeles, Calif.

[73] Assignee: Hughes Aircraft Company, Culver City, Calif.

[22] Filed: Feb. 28, 1975

[21] Appl. No.: 554,272

[52] U.S. Cl. ............... 350/2; 350/43; 350/184
[51] Int. Cl.² ................................. G02B 15/16
[58] Field of Search ........... 350/2, 184, 186, 40, 43

[56] References Cited
UNITED STATES PATENTS

| | | | |
|---|---|---|---|
| 3,030,861 | 4/1962 | Mortimer et al. | 350/43 |
| 3,421,807 | 1/1969 | Nothnagle et al. | 350/43 |
| 3,825,315 | 7/1974 | Altman et al. | 350/2 |

OTHER PUBLICATIONS
Jamieson, Optica Acta, Vol. 18, No. 1, pp. 17–30, 1971.

*Primary Examiner*—Ronald J. Stern
*Attorney, Agent, or Firm*—W. H. MacAllister; Donald C. Keaveney

[57] ABSTRACT

There is disclosed an afocal zoom lens attachment of variable magnification which is intended for use with a prime imaging lens of fixed focal length and which is particularly suited for systems using radiation having a wavelength in the infrared region of the spectrum. The attachable zoom lens system is comprised of a fixed focus front objective element and a fixed focus eyepiece with a zooming doublet and a zooming singlet therebetween and is configured to form a mechanically compensated, non-Galilean afocal zoom attachment. The system includes means for continuously varying the magnification by simultaneously moving the zooming singlet and doublet along linear and non-linear paths respectively. The doublet contains a color correcting element. A real intermediate aerial image is formed between the zooming singlet and the eyepiece at low magnifications and that image is recollimated by the eyepiece. During zooming to higher magnifications the singlet may move through the plane of the real image thereby moving its plane to contribute to aberration correction. In preferred embodiments the lens system is used as an attachment to a prime thermal imaging device and each of the lenses has a useful spectral bandpass for energy in the 2–20 micron region of the infrared spectrum.

17 Claims, 2 Drawing Figures

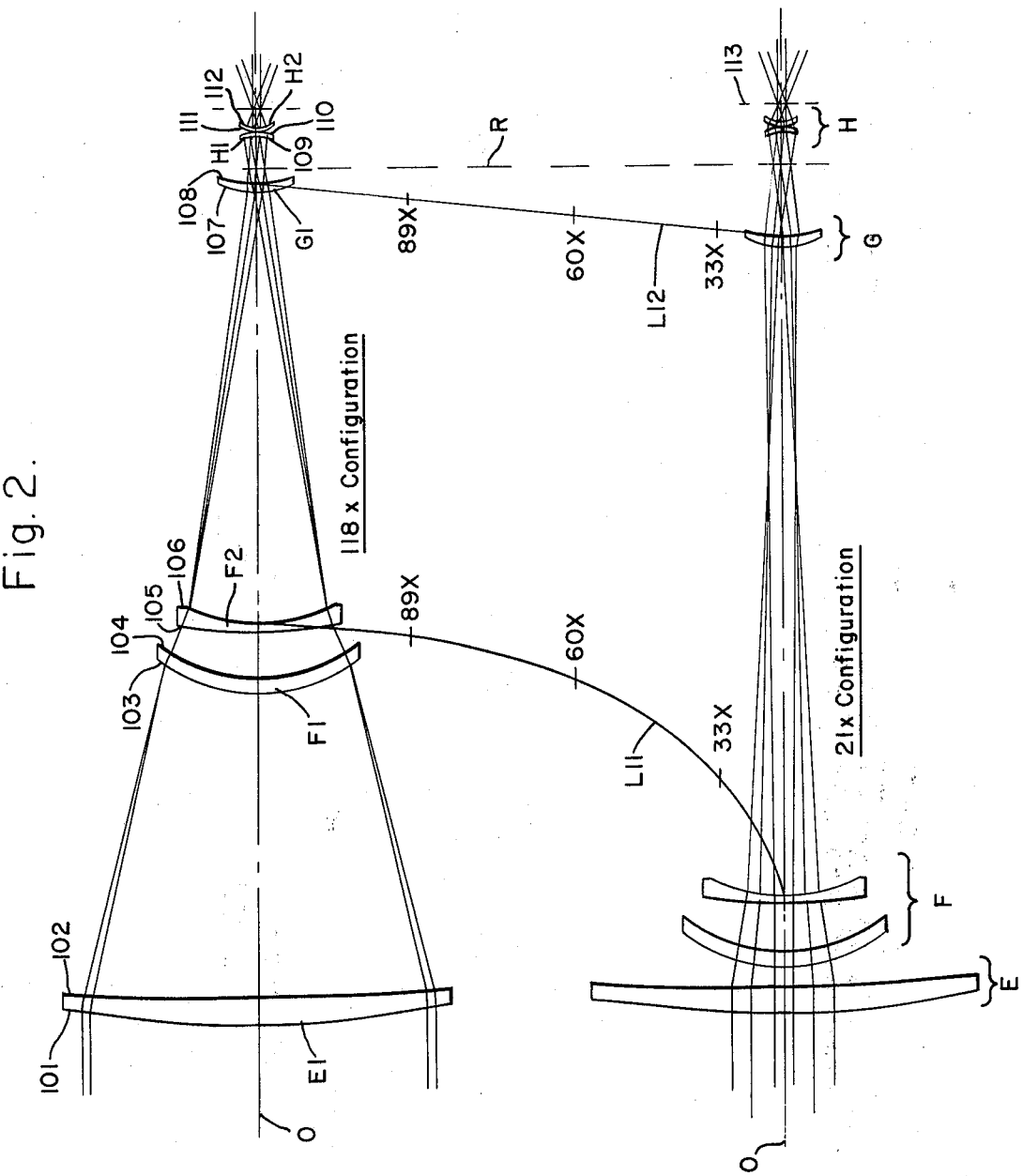

LONG-WAVE INFRARED AFOCAL ZOOM TELESCOPE

BACKGROUND OF THE INVENTION

The all-weather and night capability of infrared radar and imaging systems has led to their increasing use and to the development of lens systems suitable for use with them. One such type of system is known by the acronym "FLIR" from "forward looking infrared". These systems are preferably operated in the 2 to 20 micron wavelength region of the spectrum. Such systems are normally equipped with a minimum number of lens elements since the relatively high transmission loss in lenses having a spectral bandpass in the infrared precludes the use of a large number of lenses for aberration correction as is common practice in the visible region particularly in zoom systems. This transmission loss limitation thus poses an even greater problem than is encountered in the visible region when one attempts to provide such a FLIR system with a zoom lens capability. This is particularly true of such a zoom system which is of the bolt on or afocal type the output of which is a collimated beam of energy focused at infinity and which can provide not only acceptably small transmission loss but also usefully high image quality when used with a prime lens.

Most of the previously known zoom systems, even in the visible wavelength region, are of the finite focus or image forming output type rather than of the afocal or attachment type intended for use with a prime focusing lens. U.S. patents typical of this image forming type at visible wavelengths are: U.S. Pat. No. 3,377,119 to Takano; US. Pat. No. 3,433,559 to Vockenhuber et al; U.S. Pat. No. 3,454,321 to Klein; and U.S. Pat. No. 3,597,048 to Bertele. Focusing lens systems intended for use at infrared wavelengths are shown in U.S. Pat. Nos. 3,439,969 to Kirkpatrick and 3,825,315 to Altman et al.

In addition to their classification as either image forming or afocal in type, zoom lens systems may also be classified as being either of the optically compensated or mechanically compensated type and may be further classified as being of the Galilean or non-Galilean type. These distinctions are per se well known in the art as may be seen, for example, by reference to a book entitled "Modern Optical Engineering" by Warren J. Smith published in 1966 by McGraw-Hill Company. The author states at page 243 that a "mechanically compensated" zoom system is one in which the defocusing (which is inherent by virtue of the motion of one of the movable lens elements) is eliminated by introducing a nonlinear compensating motion of one of the other adjacent lens elements of the system which motion is effected by a cam arrangement to provide the non-linearity. At page 244 it is noted that the other technique for reducing the focus shift in a variable system is called optical compensation wherein two or more alternate (rather than adjacent) lenses are linked and moved together with respect to the fixed lens between them.

The further distinction of types of telescopic systems as being astronomical (or inverting), terrestrial (or erecting), or Galilean is discussed by the author beginning at page 209. At page 210 the author points out that in the Galilean type the internal image of the system is never actually formed. In the Galilean type the object for the eye lens is a "virtual" rather than a "real" object, no inversion occurs, and the final image presented to the eye is erect and unreversed. Since there is no real image formed in a Galilean telescope there is no location where cross hairs or a reticle may be inserted. Hence, for purposes of this specification, a non-Galilean lens system will be defined as one in which an internal real image is formed within the system, that is, somewhere between the first and last lenses of the system along the optical axis.

With these distinctions in mind it may be noted that even with respect to afocal visible wavelength zoom systems the prior art has depended primarily on the use of Galilean type systems having no real intermediate image. Such systems are illustrated by U.S. Pat. Nos. 3,320,014 to Macher and 3,679,292 to Motoaki. Where an effort has been made to use a non-Galilean system having a real intermediate image, an optically compensated system such as shown in U.S. Pat. No. 3,438,689 to Wehr has been necessarily used.

It is an object of this invention to provide a mechanically compensated non-Galilean afocal zoom lens attachment of variable magnification having as few lenses as possible for use with a prime imaging lens of fixed focal length.

It is a more specific object of the present invention to provide such a system suitable for use in the infrared wavelength region of the spectrum which system overcomes the above noted problems and limitations inherent in the design of an optical system intended for use at such infrared wavelengths and which is capable of producing high image quality throughout the zoom range of the afocal system.

SUMMARY OF THE INVENTION

This is achieved by providing a non-Galilean variable magnification mechanically compensated afocal zoom system of the type wherein each of the lenses has a useful spectral bandpass for energy in a predetermined region of the infrared spectrum (which is herein taken generally to mean the region between 0.7 and 1,000 microns and more particularly the 2–20 micron range) and wherein the total transmission loss of energy by absorption in passing through the entire lens system is less than 60 percent of the input energy. Zooming action over a ratio of at least 5 to 1 while maintaining high image quality is achieved by providing four optically coacting lens groups arranged along an optical axis to form the system. Each of the groups comprises at least one lens. The first group is a fixed focus front objective element; the second group is a zooming element moving in a first locus which is preferably non-linear; the third group is a zooming element moving in a second locus which is preferably nearly linear; and the fourth group is a fixed focus eyepiece element. Means are provided to movably mount the second and third groups so as to continously vary the magnification of the system between minimum and maximum limits. At minimum magnification the four groups of lenses are arranged in relation to each other so that the first, second and third groups of lenses produce a real intermediate aerial image at a first image plane located between the fourth group fixed eyepiece and the third group zooming element. This image is recollimated by the eyepiece group which is preferably a doublet. The system thus comprises an afocal device intended for use as an attachment to a prime imaging device, the eyepiece providing a collimated output beam of energy with an external exit pupil.

In one embodiment, the paths of motion or the loci of positions of the four groups of lenses are so related to each other that during the zooming motion of the second and third group zooming elements, the third group zooming element, at a predetermined position producing a magnification which is higher than the minimum magnification, passes through the real aerial image plane to thereby move the aerial image plane for all higher maginifcation settings of the zoom elements. The motion of the aerial image plane at higher magnification has been found to contribute to aberration correction in systems of this type by maintaining good image quality at magnifications higher than that at which the image plane begins to move. Such a system is thus able in a preferred embodiment to obtain good image quality over a range of magnifications from 3.33 × to 20 × which thus affords a 6 to 1 zoom ratio.

BRIEF DESCRIPTION OF THE DRAWINGS

These and other objects and advantages will be more fully appreciated from the detailed description below taken in conjunction with the accompanying drawings wherein like reference characters refer to like parts throughout and in which:

FIG. 2 is a view similar to FIG. 1 for a second embodiment of the invention.

DETAILED DESCRIPTION

Figure 1:
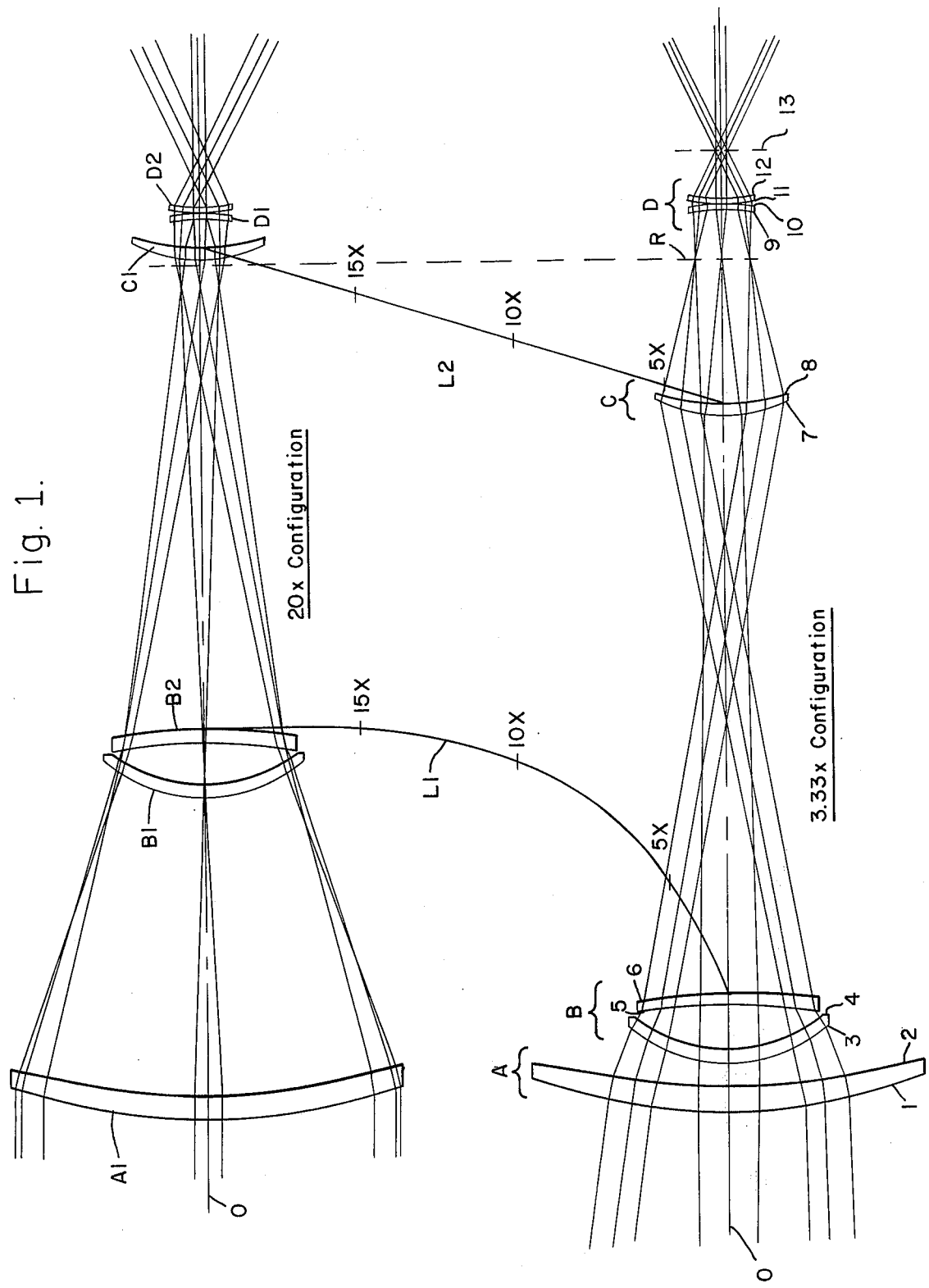
FIG. 1 is a zoom lens optical schematic view showing the lens elements of the device of the present invention in minimum and in maximum magnification configurations and indicating the loci or zoom track of the movable lenses between these two positions.

There is shown in FIG. 1 an optical schematic diagram of a mechanically compensated 6 to 1 ratio afocal non-Galilean zoom telescope for use in the long wavelength infrared spectrum and more particularly in the wavelength range between 8 and 12 microns. The attached optical schematic shows in FIG. 1 that the first embodiment of the zoom telescope comprises four optically coacting lens groups, A, B, C, and D, arranged along an optical axis, O, to form a non-Galilean mechanically compensated zoom system. The first group A comprises a single Germanium lens A1 having surfaces 1 and 2 which form a singlet objective lens. The second group B, which moves along a first locus L1 between the two positions shown in FIG. 1, is a doublet consisting of Germanium lens B1 having surfaces 3 and 4 and Zinc Selenide lens B2 having surfaces 5 and 6. This zooming group moves non-linearly with telescope magnification along the locus L1. The lens B2 is formed of Zinc Selenide in order to provide a color correcting element in the system. Lens B2 moves in unison with lens B1 along locus L1. The third group C consists of a single moving Germanium lens C1 which is moved along locus L2 linearly with magnification and functions as a singlet field lens. Lens C1 has surfaces 7 and 8. The fourth group D consists of two Germanium lenses D1 and D2 which respectively have surfaces 9 and 10 and 11 and 12. This fourth group D forms a fixed doublet eyepiece.

The zooming action of the two moving lens groups B and C is controlled by a conventional cam mechanism so that both groups are always at the same magnification value point along their respective loci. Their motion between such points results in a continuous change in system magnification from 3.33 × minimum to 20.0 × maximum. The field of view in object space varies correspondingly from 9.0° × 12.75° to 1.5° × 2.125°. The exit field of view remains constant throughout the zoom range at 30° × 42.5°. The position of the plane 13 of the exit pupil also remains constant throughout the zoom range. Also, the entrance pupil diameter varies as a function of the variation in magnification of the zoom system whereas the exit pupil diameter remains constant throughout the zoom range.

The first three groups of lenses, A, B, and C form a real intermediate image at the plane R in the low magnification position which image is recollimated by the fixed eyepiece group D to provide a collimated output beam of energy through the exit pupil. As the lens group C moves through the zooming range its lens C1 passes through the plane R of the real intermediate image which image plane is thereafter moved by further motion of lens C1 to contribute to aberration correction at higher magnification ranges. This motion of the real image can be permitted in this particular system since the intermediate real image is recollimated by the eyepiece which must provide collimated energy with an external exit pupil as an output to the focusing lens of the infrared scanner with which the system is intended for use. Self focusing telescopes are of course designed to provide a stationary real image output. This motion of the real image plane in the present type of system is however not only permissible, but in fact desirable for aberration correction.

The system of FIG. 1 in a preferred embodiment is fabricated in accordance with the constructional data given in Table I below. In this table it will be noted that lens group A in this embodiment comprises only the single lens A1 having surfaces 1 and 2. Lens group B comprises the two lenses B1 and B2 having respectively surfaces 3 and 4 and 5 and 6. A similar notation is used throughout. The figures for the radii and all other magnitudes are given in inches. The radius of course refers to the radius of curvature of the particular surface specified. The thickness refers to the distance along optical axis O from the surface for which the thickness is stated to the next highest numbered surface. Thus the thickness from surface 1 to surface 2 of lens A1 is 0.850 inch. The various thicknesses through air between the surface 2 of lens A1 and the surface 3 of lens B1 are given in Table II below as listed under the column headed Thickness 2 corresponding to different exemplary magnification settings of the lens system along the locus L1 of movement of lens group B. A similar notation is used for other fixed and variable distances. All of the lenses are germanium having an index of refraction of 4.00 except lens B2 which is Zinc Selenide having an index of refraction of 2.41.

TABLE I

| Lens/Surface | Radius | Thickness | Mat'l | Lens O.D. |
|---|---|---|---|---|
| A1 | | | | |
| 1 | 18.149 | 0.850 | Ge | |
| 2 | 24.986 | Tbl II | Air | 12.6 |
| B1 | | | | |
| 3 | 4.879 | .350 | Ge | |
| 4 | 4.447 | 1.436 | Air | 6.4 |
| B2 | | | | |
| 5 | −24.428 | .350 | ZnSe | |
| 6 | −45.901 | Tbl II | Air | 5.8 |
| C1 | | | | |
| 7 | 5.136 | .350 | Ge | |
| 8 | 7.687 | Tbl II | Air | 4.2 |
| D1 | | | | |
| 9 | −3.393 | .140 | Ge | |
| 10 | −3.186 | .010 | Air | 2.2 |

TABLE I-continued

| Lens/Surface | Radius | Thickness | Mat'l | Lens O.D. |
|---|---|---|---|---|
| D2 | | | | |
| 11 | 2.600 | .160 | Ge | |
| 12 | 3.846 | 1.298 | Air | 2.1 |
| 13 | | Exit pupil | | |

TABLE II

| Magnification | Typical Zoom Spacings | | |
|---|---|---|---|
| | THK 2 | THK 6 | THK 8 |
| 20× | 9.334 | 14.738 | .984 |
| 15× | 9.309 | 13.423 | 2.324 |
| 10× | 8.435 | 12.758 | 3.862 |
| 5× | 4.328 | 15.175 | 5.553 |
| 3⅓× | .750 | 18.237 | 6.069 |

In a second embodiment designed to provide a zoom or variable magnification range from 21 power to 118 power in the 3–5 micron spectral region, the components and configurations are as shown in FIG. 2 and as described in Tables III and IV below. This system, which affords a zoom ratio of better than 5.6 to 1, has the same basic configuration of lens groups and design philosophy as the first embodiment, but the lens materials and prescription are different and the system does not exhibit the phenomenon of motion of the plane R of the intermediate real image. The corresponding four lens groups are shown as comprising a fixed objective E, a doublet group F having non-linear motion along the locus L11, a zooming singlet group G having nearly linearly motion along the locus L12, and a fixed doublet eyepiece group H to recollimate the real image formed at the plane R. It will be noticed that the prescriptions are such that the locus L12 does not intersect the plane R in this embodiment.

Lens group E consists of a single objective lens E1 fabricated of silicon and having the prescription set forth in Table III. Lens group F consists of lens F1 fabricated of silicon and lens F2 fabricated of zinc sulfide for color correction. Lens group G consists of the zooming singlet G1 fabricated of silicon. Lens group H consists of the doublet eyepiece. Its lenses H1 and H2 are both fabricated of germanium. The index of refraction for germanium is 4.02, for silicon it is 3.42 and for zinc sulfide it is 2.25. The lens prescriptions for this embodiment are set forth in Table III in a notation entirely analogous to that used above and the spacings between surfaces resulting from the motion of the zooming elements are set forth in Table IV for representative magnification powers.

TABLE III

| Lens/Surface | Radius | Thickness | Mat'l | Lens O.D. |
|---|---|---|---|---|
| E | | | | |
| 101 | 31.200 | .700 | Si | |
| 102 | 78.243 | Tbl IV | Air | 11.0 |
| F1 | | | | |
| 103 | 4.780 | .400 | Si | |
| 104 | 5.037 | 1.311 | Air | 5.75 |
| F2 | | | | |
| 105 | 8.929 | .300 | ZnS | |
| 106 | 4.641 | Tbl IV | Air | 4.70 |
| G | | | | |
| 107 | 2.759 | .120 | Si | |
| 108 | 4.891 | Tbl IV | Air | 1.30 |
| H1 | | | | |
| 109 | −.3827 | .050 | Ge | |
| 110 | −.3359 | .010 | Air | 0.38 |
| H2 | | | | |
| 111 | .2183 | .045 | Ge | |
| 112 | .2185 | .168 | Air | 0.35 |
| 113 | | Exit pupil | | |

TABLE IV

| Magnification | Typical Zoom Spacings | | |
|---|---|---|---|
| | THK 2 | THK 6 | THK 8 |
| 118× | 8.792 | 12.448 | 0.658 |
| 89× | 8.321 | 12.378 | 1.199 |
| 60× | 7.017 | 13.111 | 1.769 |
| 33× | 3.797 | 15.801 | 2.300 |
| 21× | 0.599 | 18.794 | 2.505 |

In both embodiments there is achieved an image quality having values which are near the diffraction limited values throughout the zoom range and they achieve this using a lens system having only six individual lenses arranged in four groups which system has a transmittance loss of incident radiation energy passing through the system of less than 60 percent. That is to say, more than 40 percent of the energy incident on the objective exits from the eyepiece. In terms of more specific numerical values of image quality, the system of FIG. 1 produces an image quality of at least 0.083 milliradians at 20 power and of at least 0.5 milliradians at 3.33 power. The second embodiment shown in FIG. 2 produces an image quality of 0.043 milliradians at 118 power and an image quality of 0.235 milliradians at 21 power.

It is thus seen that there has been provided afocal zoom lens attachments of variable magnification which are suitable for use with a prime imaging lens of fixed focal length and which are particularly suited for systems using infrared radiation in the 2 micron to 20 micron spectral region which is commonly used in FLIR systems and other infrared thermal imaging and scanning devices.

What is claimed is:

1. In an afocal zoom lens attachment of variable magnification use with a prime imaging lens of fixed focal length, the improvement comprising:
   a. four optically coacting lens groups arranged sequentially along an optical axis to form a non-Galilean mechanically compensated zoom system, each of said groups comprising at least one lens, each of said lenses having a useful spectral bandpass in the infared wavelength region, the first group being a fixed focus front objective element, the second group being a zooming element moving in a first locus, the third group being a zooming element moving in a second locus, and the fourth group being a fixed focus eyepiece element;
   b. means to continuously vary the magnification of said system between minimum and maximum limits comprising means to simultaneously move said second and third group zooming elements through predetermined loci having a predetermined relationship to each other, one of said loci being substantially linear and the other of said loci being nonlinear; and,
   c. said four groups of lenses when said second and third group zooming elements are positioned to produce said minimum magnification of said system being arranged in relation to each other so that said first, second and third groups of lenses produce a real aerial image at a first intermediate image plane between said third and fourth groups of lenses which image is recollimated by said fourth group eyepiece element.

2. A system as in claim 1 wherein the locus of said third group zooming element is substantially linear and the locus of said second group zooming element is nonlinear.

3. A system as in claim 1 wherein said first lens group is a single fixed position front objective lens, said second lens group is a zooming doublet moving nonlinearly, one of the lenses of said doublet providing chromatic aberration correction for said system, and said third lens group is a zooming singlet moving substantially linearly.

4. A system as in claim 1 wherein said fixed focus eyepiece is a doublet which provides a collimated output beam of energy with an external exit pupil.

5. A system as in claim 3 wherein said fixed focus eyepiece is a doublet which provides a collimated output beam of energy with an external exit pupil.

6. A system as in claim 5 wherein the field of view of object space varies as a function of the variation in magnification of the zoom system whereas the field of view at said eyepiece exit pupil remains constant throughout the zoom range and wherein the entrance pupil diameter varies as a function of the variation in magnification of the zoom system whereas the exit pupil diameter remains constant throughout the zoom range.

7. A system as in claim 1 wherein:
the loci of positions of said four groups of lenses are so related to each other that during the zooming motion of said second and third group zooming elements said third group zooming element at a predetermined position producing a magnification higher than said minimum magnification passes through said first aerial image plane thereby moving said aerial image plane for all higher magnification settings of said zoom elements, said motion of said aerial image plane contributing to aberration correction to maintain good image quality at magnifications higher than that at which said image plane beings to move.

8. A system in claim 3 wherein:
the loci of positions of said four groups of lenses are so related to each other that during the zooming motion of said second and third group zooming elements said third group zooming element at a predetermined position produciing a magnification higher than said minimum magnification passes through said first aerial image plane thereby moving said aerial image plane for all higher magnification settings of said zoom elements, said motion of said aerial image plane contributing to aberration correction to maintain good image quality at magnifications higher than that at which said image plane begins to move.

9. A system as in claim 6 wherein:
the loci of positions of said four groups of lenses are so related to each other that during the zooming motion of said second and third group zooming elements said third group zooming element at a predetermined position producing a magnification higher than said minimum magnification passes through said first aerial image plane thereby moving said aerial image plane for all higher magnification settings of said zoom elements, said motion of said aerial image plane contributing to aberration correction to maintain good image quality at magnifications higher than at which said image plane begins to move.

10. A system as in claim 1 wherein each of said lenses has a useful spectral bandpass for energy in the wavelength region between 2 and 20 microns, the total transmission loss of energy at any of said wavelengths by absorption in passing through said entire lens system being less than 60 percent; and,
wherein the system has a zoom ratio of at least 5 to 1.

11. A system as in claim 3 wherein each of said lenses has a useful spectral bandpass for energy in the wavelength region between 2 and 20 microns, the total transmission loss of energy at any of said wavelengths by absorption in passing through said entire lens system being less than 60 percent; and,
wherein the system has a zoom ratio of at least 5 to 1.

12. A system as in claim 4 wherein each of said lenses has a useful spectral bandpass for energy in the wavelength region between 2 and 20 microns, the total transmission loss of energy at any of said wavelengths by absorption in passing through said entire lens system being less than 60 percent; and,
wherein the system has a zoom ratio of at least 5 to 1.

13. A system as in claim 7 wherein each of said lenses has a useful spectral bandpass for energy in the wavelength region between 2 and 20 microns, the total transmission loss of energy at any of said wavelengths by absorption in passing through said entire lens system being less than 60 percent; and,
wherein the system has a zoom ratio of at least 5 to 1.

14. A system as in claim 8 wherein each of said lenses has a useful spectral bandpass for energy in the wavelength region between 2 and 20 microns, the total transmission loss of energy at any of said wavelengths by absorption in passing through said entire lens system being less than 60 percent; and,
wherein the system has a zoom ratio of at least 5 to 1.

15. A system as in claim 9 wherein each of said lenses has a useful spectral bandpass for energy in the wavelength region between 2 and 20 microns, the total transmission loss of energy at any of said wavelengths by absorption in passing through said entire lens system being less than 60 percent; and,
wherein the system has a zoom ratio of at least 5 to 1.

16. A system as in claim 15 wherein said four lens groups comprise the groups A, B, C and D as shown in FIG. 1 of the drawings and wherein said lenses are fabricated and mounted in accordance with the following construction Tables I and II wherein the "radius" refers to the radius of curvature of the lens surface indicated by the corresponding number, the "thickness" refers to the distance along the optical axis O from the indicated surface to the surface of next higher number, and the materials and lens outer diameters are as specified, the measured quantities being stated in inches as follows:

TABLE I

| Lens/Surface | Radius | Thickness | Mat'l | Lens O.D. |
|---|---|---|---|---|
| A 1 | | | | |
| 1 | 18.149 | 0.850 | Ge | |
| 2 | 24.986 | Tbl II | Air | 12.6 |
| B 1 | | | | |
| 3 | 4.879 | .350 | Ge | |

TABLE I-continued

| Lens/Surface | Radius | Thickness | Mat'l | Lens O.D. |
|---|---|---|---|---|
| 4 | 4.447 | 1.436 | Air | 6.4 |
| B3 | | | | |
| 5 | −24.428 | .350 | ZnSe | |
| 6 | −45.901 | Tbl II | Air | 5.8 |
| C1 | | | | |
| 7 | 5.136 | .350 | Ge | |
| 8 | 7.687 | Tbl II | Air | 4.2 |
| D1 | | | | |
| 9 | −3.393 | .140 | Ge | |
| 10 | −3.186 | .010 | Air | 2.2 |
| D2 | | | | |
| 11 | 2.600 | .160 | Ge | |
| 12 | 3.846 | 1.298 | Air | 2.1 |
| 13 | | Exit pupil | | |

TABLE II

| Magnification | Typical Zoom Spacings | | |
|---|---|---|---|
| | THK 2 | THK 6 | THK 8 |
| 20× | 9.334 | 14.738 | .984 |
| 15× | 9.309 | 13.423 | 2.324 |
| 10× | 8.435 | 12.758 | 3.862 |
| 5× | 4.328 | 15.175 | 5.553 |
| 3½× | .750 | 18.237 | 6.069. |

17. A system as in claim 10 wherein said four lens groups comprise the groups E, F, G and H as shown in FIG. 2 of the drawings and wherein said lenses are fabricated and mounted in accordance with the following construction Tables III and IV wherein the "radius" refers to the radius of curvature of the lens surface of corresponding number, the thickness refers to the distance along the optical axis O from the indicated surface to the surface of next higher number, and the materials and lens outer diameters are as specified in Tables III and IV as follows:

TABLE III

| Lens/Surface | Radius | Thickness | Mat'l | Lens O.D. |
|---|---|---|---|---|
| E | | | | |
| 101 | 31.200 | .700 | Si | |
| 102 | 78.243 | Tbl IV | Air | 11.0 |
| F1 | | | | |
| 103 | 4.780 | .400 | Si | |
| 104 | 5.037 | 1.311 | Air | 5.75 |
| F2 | | | | |
| 105 | 8.929 | .300 | ZnS | |
| 106 | 4.641 | Tbl IV | Air | 4.70 |
| G | | | | |
| 107 | 2.759 | .120 | Si | |
| 108 | 4.891 | Tbl IV | Air | 1.30 |
| H1 | | | | |
| 109 | −.3827 | .050 | Ge | |
| 110 | −.3359 | .010 | Air | 0.38 |
| H2 | | | | |
| 111 | .2183 | .045 | Ge | |
| 112 | .2185 | .168 | Air | 0.35 |
| 113 | | Exit pupil | | |

TABLE IV

| Magnification | Typical Zoom Spacings | | |
|---|---|---|---|
| | THK 2 | THK 6 | THK 8 |
| 118× | 8.792 | 12.448 | 0.658 |
| 89× | 8.321 | 12.378 | 1.199 |
| 60× | 7.017 | 13.111 | 1.769 |
| 33× | 3.797 | 15.801 | 2.300 |
| 21× | 0.599 | 18.794 | 2.505. |

* * * * *